(12) United States Patent
Karlsson

(10) Patent No.: US 6,241,037 B1
(45) Date of Patent: Jun. 5, 2001

(54) VEHICLE DEVICE

(75) Inventor: Mats Karlsson, Säffle (SE)

(73) Assignee: Unic Aktiebolag (SE)

( * ) Notice: Subject to any disclaimer, the term of this patent is extended or adjusted under 35 U.S.C. 154(b) by 0 days.

(21) Appl. No.: 09/381,046

(22) PCT Filed: Mar. 26, 1998

(86) PCT No.: PCT/SE98/00546

§ 371 Date: Sep. 14, 1999

§ 102(e) Date: Sep. 14, 1999

(87) PCT Pub. No.: WO98/43845

PCT Pub. Date: Oct. 8, 1998

(30) Foreign Application Priority Data

Mar. 27, 1997 (SE) .................................................... 9701138

(51) Int. Cl.$^7$ .................................................... B60K 17/35
(52) U.S. Cl. .............................. 180/6.2; 180/248; 180/249
(58) Field of Search ..................................... 180/197, 248, 180/249, 6.2, 6.44, 6.24, 6.32; 475/34, 223

(56) References Cited

U.S. PATENT DOCUMENTS

| | | | |
|---|---|---|---|
| 2,004,929 | 6/1935 | Centervall | 180/9.2 |
| 4,113,044 * | 9/1978 | Williams et al. | 180/51 |
| 4,630,505 * | 12/1986 | Williamson | 74/711 |
| 4,794,756 * | 1/1989 | Iseman | 60/489 |
| 4,955,442 | 9/1990 | Crabb et al. | 180/6.44 |
| 5,396,768 * | 3/1995 | Zulu | 60/487 |
| 5,415,596 | 5/1995 | Zulu | 475/27 |
| 5,529,136 | 6/1996 | Zulu | 180/6.44 |

FOREIGN PATENT DOCUMENTS 2047643   12/1980   (GB) .

OTHER PUBLICATIONS

PCT Application (PCTSE98/00546) Published by WIPO No. 98/43845, Oct. 8, 1998.

* cited by examiner

*Primary Examiner*—Anne Marie Boehler
*Assistant Examiner*—Tony Winner
(74) *Attorney, Agent, or Firm*—George T. Marcou; Kilpatrick Stockton LLP

(57) ABSTRACT

A device for a differential gear for vehicles having a driving mechanism capable of driving the vehicle and a steering mechanism capable of changing the direction of the vehicle, which differential gear has an input driving shaft, two output shafts connected to the vehicle's driving mechanism, at least one hydraulic pump capable of producing a hydraulic flow, and at least one hydraulic motor communicating with the hydraulic pump and arranged to the differential gear, capable of achieving a difference in rotational speed between the output shafts. The device is capable of regulating the hydraulic flow between the hydraulic pump and the hydraulic motor depending on the steering direction of the steering mechanism and the velocity of the vehicle.

7 Claims, 12 Drawing Sheets

007# VEHICLE DEVICE

TECHNICAL FIELD

The present invention relates to a device for a differential gear for vehicles, comprising driving means capable of driving the vehicle and steering means capable of changing the direction of the vehicle, which differential gear comprises an input driving shaft, two output shafts connected to the vehicle's driving means, at least one hydraulic pump capable of delivering a hydraulic flow, and at least one hydraulic motor communicating with the hydraulic pump and arranged to the differential gear, capable of achieving a difference in rotational speed between the output shafts.

BACKGROUND TO THE INVENTION

Differential gears are used in principle in all types of vehicles if a differentiation in rotational speed is to be achieved between the driving wheels. This is due to that the wheels on a vehicle rotate at a different velocity when the vehicle turns, due to the fact that the wheels follow tracks with a different radius. However, the differential has the disadvantage that if one driving wheel has lower friction against the ground than the other driving wheel, the wheel with the lower friction will begin to spin and the vehicle loses propulsion power, due to the fact that the differential is torque-equalizing and thus both driving wheels will have the torque which the wheel with the lower friction can transmit.

To remedy this problem, a number of devices have been developed. The simplest is a differential lock, which quite simply locks the drive shafts to one another so that they are forced to rotate at the same velocity. This is normally only used in extreme cases as it places great strain on the transmission and tires.

One development of this is to arrange a differential brake. These comprise a braking device which often consists of disc packs. The brake is activated in various ways and slows down the differences in rotational speed, often due to the braking moment increasing as the driving torque increases. In advanced types of differential brakes, the braking moment can be changed via hydraulics controlled by a computer. This requires the rotational speed differences to be detected by sensors which sense the rotation of the shafts. The systems can be more or less sophisticated. being provided with information regarding the driving torque of the vehicle, steering deflection, velocity, gear selection and the like The differential brakes which are activated by the torque often have a certain preload, i.e. the discs already lie close to one another in the unloaded state. This is done deliberately in this way precisely on account of the fact that a differential gear is torque-equalizing. The preload is required to transmit a certain torque to the driving wheel which has the higher friction as stated above. The preload thus provides a certain straining effect at the differential even when this is not desirable.

The general limitation with differential brakes is that they cannot achieve a certain defined rotational speed difference between the drive shafts, but can only slow down a rotational speed difference which is too great.

ACCOUNT OF THE INVENTION

The object of the invention is to achieve differentiated control of the rotation of a vehicle's drive shafts starting out from the desired steering direction.

This is achieved according to one aspect of the invention according to the introduction characterized by means capable of regulating the hydraulic flow between the hydraulic pump and the hydraulic motor depending on the steering direction of the steering means and the velocity of the vehicle.

According to another aspect of the invention, this is characterized in that the hydraulic pump is of the displacement type and that the hydraulic motor is of the displacement type.

According to a further aspect of the invention, a device is obtained characterized in that the magnitude of the oil flow is controlled by the steering direction of the steering means, the flow being mainly zero when the steering direction of the steering means is straight forward, and that the oil flow gradually increases the more the steering direction of the steering means deviates from a propulsion direction straight forward, that the direction of the oil flow is controlled by whether the direction of steering of the steering means deviates to the left or right of this, and that the oil flow increases as the velocity increases.

According to a further aspect of the invention, a device is obtained characterized in that the pump is connected drivably to the vehicle's drive, which is arranged between the vehicle's engine and the two output shafts.

The great advantage of the device according to the invention is that differentiated steering and driving are obtained from the driving means starting out from the steering direction of the steering means, in which the driving of the drive shafts is effected primarily by mechanical means and control of the rotational speed differences between the drive shafts is achieved hydraulically. This rotational speed control is always effected starting out from the steering direction of the steering means and there is thus no reason to take into account, and control, the actually transferred torques or current rotational speed differences of the drive shafts, and attempt to correct the deviations as they occur Due to the fact that the hydraulic pump is preferably connected to the vehicle's drive, which is arranged between the vehicle's gear box and the two output shafts, for example the cardan shaft, a direct link is obtained between the flow and the velocity of the vehicle, no special valve arrangements being required to regulate the oil flow in relation to the vehicle's velocity. Due to the fact that the hydraulic motor and the hydraulic pump are of the displacement type, in which the pump has variable displacement, and owing to the fact that they are arranged in a hydraulic system in which mainly all the oil which the pump delivers passes through the motor, a certain gear ratio exists between the rotating shafts of the pump and the motor for a certain setting of the pump's displacement, and this gear ratio is varied by varying the displacement.

Due to the fact that the pump is operated by a shaft of which the rate of rotation is directly proportional to the propulsion velocity of the vehicle and that the pump's displacement setting is linked to the vehicle's steering deflection, synchronization can be obtained between the driving wheels and the steering wheels, i.e. the difference in rotational speed of the driving wheels corresponds to the turning radius which the vehicle acquires from the current steering deflection.

It is also possible with the device according to the invention to combine the improved efficiency of the mechanical transmission with a system which precisely controls the difference in rotational speed between the drive shafts and thereby gives the vehicle a steering capacity of a precision which, as far as is known, was previously only possible with vehicles driven by hydraulic motors.

The device according to the invention thus functions without sensors which sense the rotational speed differences between the driving wheels or other electronics which are to control differential brakes or the like.

Further aspects and advantages of the present invention will be evident from the detailed description of a number of conceivable embodiments and variants and from the following patent claims.

BRIEF DESCRIPTION OF DRAWINGS

In the following description of a number of conceivable embodiments, reference will be made to the enclosed drawings, of which

DESCRIPTION OF CONCEIVABLE EMBODIMENTS

Figure 1:
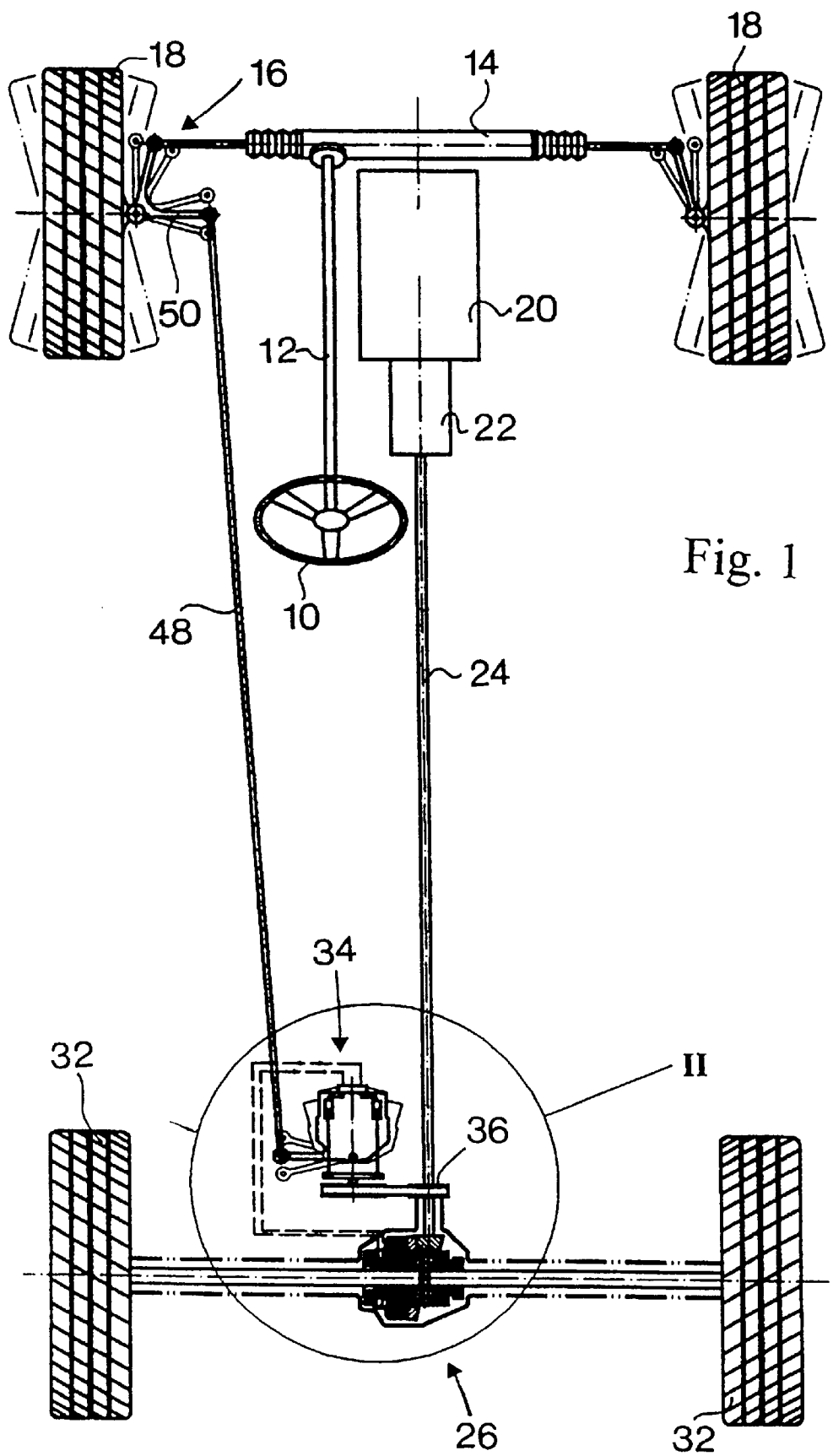
FIG. 1 shows a detailed view from above of an embodiment of the device according to the invention arranged in a rear-wheel-driven car.

The device according to the invention shown in FIG. 1 is fitted in a car. The car is fitted in a conventional manner with a steering wheel 10 and a steering column 12, which is capable via a steering gear 14 and steering connecting rod 16 of turning the front wheels 18. The car is also fitted in a conventional manner with a combustion engine 20 and a gear box 22 connected to this. The rotation of the engine is transmitted from the gear box 22 to a cardan shaft 24 which extends as far as the rear part of the car, where the rotation is transmitted via a final drive 26 to two drive shafts 28, 30 and out to the rear wheels 32.

A hydraulic pump 34 of the displacement type is connected to the cardan shaft via a transmission 36. The casing 40 of the hydraulic pump is attached pivotally to the vehicle around a fastening point 44, which means that the direction of flow can be changed and the displacement can be varied. The pump casing is equipped with a fixed articulated arm 46, assigned to which pivotally is a connecting rod 48. The connecting rod extends as far as and is attached to an articulated rod 50 assigned to the car's steering system. The steering system, connecting rod and hydraulic pump are arranged so that when the wheels are standing straight forward, the pump is in its central position where rotation around the fixed point is concerned, and the pump does not produce any flow. If the pump is turned in one direction, one direction of flow is obtained and if it is turned in the other direction, an opposed direction of flow is obtained.

Figure 2:
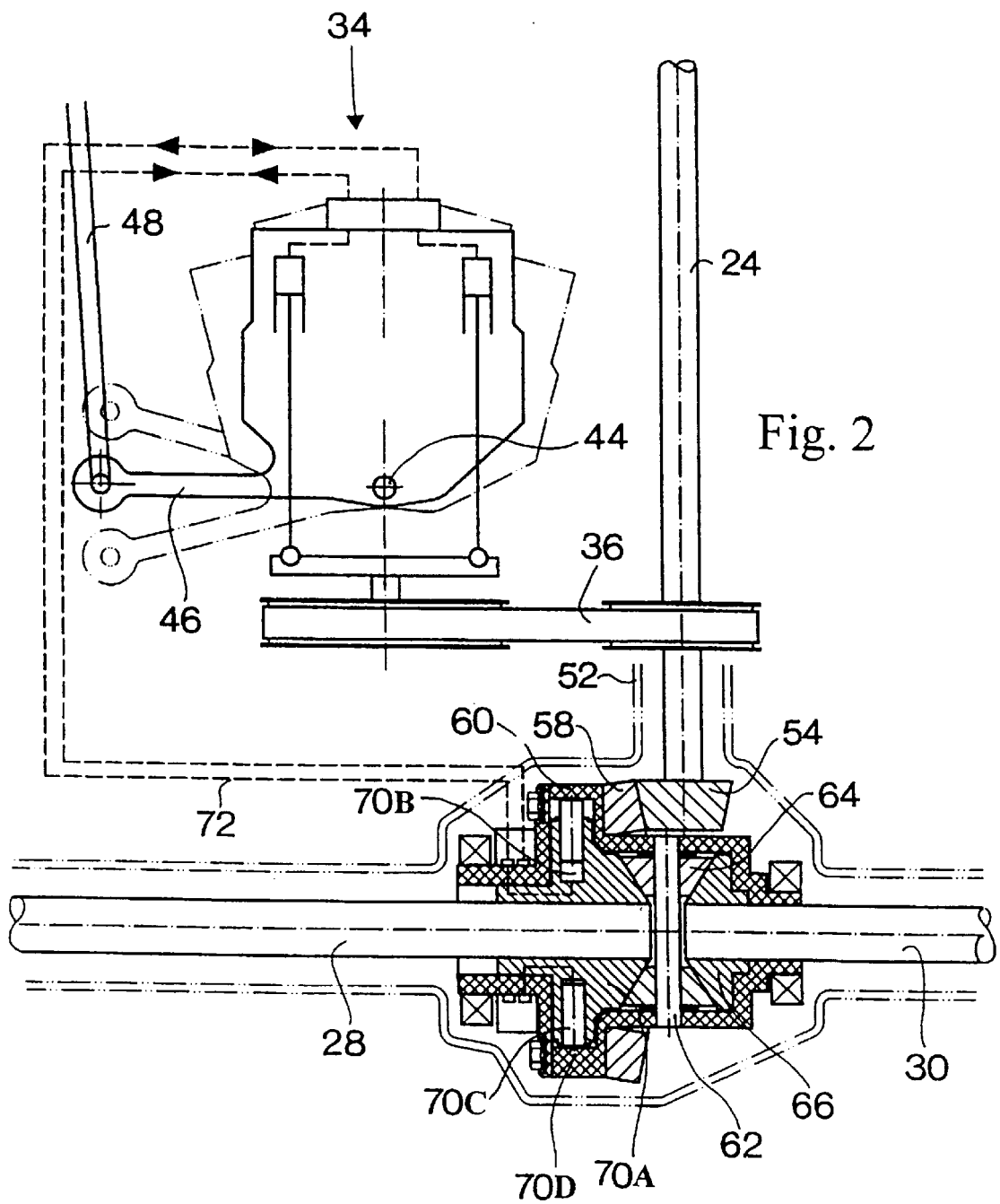
FIG. 2 shows a detailed view partly in cross-section of area II in FIG. 1.

Inside the casing 52 of the final drive 26 is a gear wheel 54 fixedly attached to the cardan shaft 24, FIG. 2. The gear wheel 54 engages in a crown wheel 58, which crown wheel is fixedly attached to a differential casing 60. A shaft 62 is attached at its ends to the differential casing, supported rotatably on which shaft 62 are two differential gears 64. The differential gears 64 engage on the one hand in a gear wheel 66 fixedly attached to the inner end of one drive shaft 30 and on the other hand in a part 70A, referred to below as a rotor, of a hydraulic motor 70. The rotor 70A is fitted with radial cylinder bores 70B in which pistons 70C run. The rotor 70A is also fixedly attached to the inner end of the other drive shaft 28. The other part 70D, referred to below as the stator, of the hydraulic motor is disposed in the differential casing 60. The stator comprises a cam which runs around the inside of the differential casing, against which cam the pistons 70C slide. The cylinder bores 70B of the rotor 70A are connected via conduits 72 to the hydraulic pump 34. A second hydraulic pump (not shown), referred to below as the support pump, driven in a suitable manner, is preferably connected to the conduit ts 72.

The device functions as follows. The support pump provides a certain basic pressure for the hydraulic motor 70, in order to ensure that the hydraulic pump, hydraulic motor and conduits are filled with hydraulic oil. When the car is driving straight forward, the hydraulic pump is in its central position and does not supply any flow to the hydraulic motor 70.

The rotation from the cardan shaft 24 is transmitted via the crown wheel 58 to the differential casing 60, at which the stator 70D rotates at this velocity. The shaft 62 disposed in the differential casing thus rotates and the differential wheels 64 transmit this rotation on the one hand to one drive shaft 30 and to the rotor 70A and the other drive shaft 28 to which this is attached. Due to the fact that the rotor's cylinders 70B are filled with oil and its pistons 70C lie close to the stator's cam, a hydraulic link is obtained between the rotor and the stator and these rotate at the same velocity, i.e. the velocity of the differential casing. The differential is thus locked and a rotational speed of equal magnitude is transmitted to the two drive shafts.

When the vehicle turns, the steering deflection will influence the connecting rod 48, which turns the hydraulic pump 34. The turning means that hydraulic oil with a certain direction of flow will be pumped to the hydraulic motor 70. When negotiating the bend, it is intended that the outer wheel shall rotate more quickly than the inner, due to the fact that the outer wheel follows a curve with a greater radius than the inner. The flow from the hydraulic pump is then such that the oil drives the rotor's pistons 70C in a certain sequence, these being pressed against the cam of the stator 70D, at which the rotor 70A rotates in a certain direction of rotation in relation to the stator. The rotor and the stator rotate in the same direction in relation to the rear shaft casing 52. A difference in rotational speed is thus obtained between the drive shafts due to the fact that the rotor is attached to one drive shaft and the stator is attached to the differential casing. The difference in rotational speed between the drive shafts is controlled by the flow to the hydraulic motor. The flow is controlled in turn by the steering deflection and the velocity of the vehicle, as the pump is connected to the cardan shaft. Control of the flow depending on the velocity of the vehicle is necessary as the difference in rotational speed between the drive shafts is velocity-dependent, as demonstrated by a simple example.

Assume that a vehicle drives in a circle, in which case the inner wheel follows a circle with a radius of 4 metres and the outer a circle with a radius of 6 metres. If it is assumed that the circumference of the wheels is 1 metre, the inner wheel rotates approximately 24 revolutions in a complete turn of the circle and the outer wheel approximately 36 revolutions. If the vehicle now completes a turn of the circle in 1 minute, the inner wheel rotates at 24 revolutions/minute and the outer at 36 revolutions/minute, in which case the rotational speed difference is 12 revolutions/minute. If the vehicle should double its velocity so that a turn is completed in 0.5 minutes, the inner wheel then rotates at 48 revolutions/minute and the outer at 72 revolutions/minute, and thus at a rotational speed difference of 24 revolutions/minute. The conclusion is that doubling the velocity produces double the difference in rotational speed for the same steering deflection. Thus the flow is also velocity-dependent. This is solved by the pump flow being proportional to the velocity of the vehicle in that its operation is linked to the cardan shaft, i.e. the faster the vehicle is driven, the faster the pump will rotate. A controlled differentiation of the rotational speed of the drive shafts is thus obtained with the device starting out not only from the desired steering direction but also the velocity of the vehicle.

If the car instead turns in the other direction, the wheel which was previously inside, now the outer wheel, shall rotate rather more quickly than the other wheel. Due to the steering deflection, the pump is turned in the other direction and the direction of flow is changed. The hydraulic oil will now drive the pistons in the rotor in a certain sequence against the stator's cam, so that the rotor will now rotate in the other direction in relation to the stator, and thus this drive shaft will rotate more slowly than the other drive shaft.

With the device a controlled rotational speed difference is thus obtained between the drive shafts over a range from a situation in which the drive shaft with the rotor affixed rotates more slowly than the other drive shaft, i.e. a direction of flow at the hydraulic motor, via a situation in which the shafts rotate at the same velocity, i.e. no flow from the hydraulic pump, to a situation in which the drive shaft with the rotor rotates more quickly than the other drive shaft, i.e with an opposed direction of flow from the hydraulic pump.

For the turning radius of the driving wheels and their relative rotational speed difference to coincide with the turning radius of the vehicle starting out from its steering wheels and the velocity of the vehicle, factors such as the displacement of the hydraulic pump and hydraulic motor, the gearing at the hydraulic motor's drive and the mechanics which control the position of the pump are to be taken into consideration to give the desired function.

Due to the fact that the hydraulic motor and the hydraulic pump are of the displacement type, in which the pump has variable displacement, and due to the fact that they are arranged in a hydraulic system in which mainly all oil which the pump delivers passes through the motor, a certain gear ratio exists between the rotating shafts of the pump and the motor for a certain setting of the pump displacement, and this gear ratio is varied by varying the displacement.

Owing to the fact that the pump is driven by a shaft, the rotation velocity of which is directly proportional to the propulsion velocity of the vehicle and that the pump's displacement setting is linked to the steering deflection of the vehicle, synchronization can be obtained between the driving wheels and steering wheels, i.e. the difference in rotational speed of the driving wheels corresponds to the turning radius which the vehicle acquires from the current steering deflection.

Certain vehicles are driven on a soft base and/or with tyres which mean that the driving wheels have a somewhat higher peripheral velocity than the base, i.e. continuous skidding. On these the system can be dimensioned in such a way that a rather greater rotational speed difference than the theoretical difference is supplied to the driving wheels in order to compensate for greater skidding at the outer wheels. "Over-skidding" of this kind can also be controllable from the driver's seat so as to adapt the vehicle thus to various driving conditions.

Figure 3:
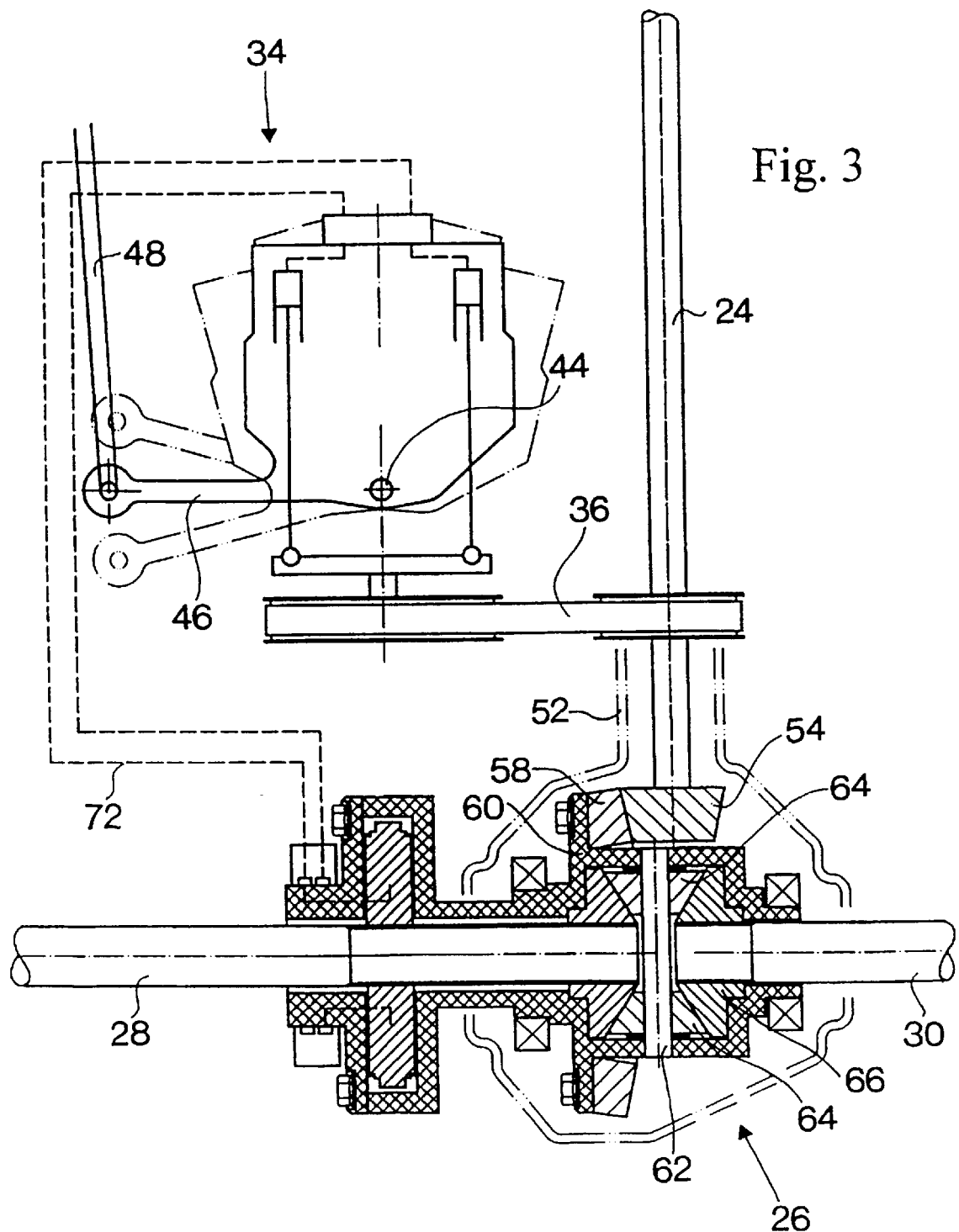
FIG. 3 shows a variant of FIG. 2 of the placing of a hydraulic motor included in the invention.

FIG. 3 shows a variant of the device according to the invention. In this case the hydraulic motor 70 is disposed outside the rear axle casing 52 where the stator 70D is fixedly connected via a cylindrical part 80 to the differential housing 60. This variant can be suitable where it is difficult for various reasons to accommodate the hydraulic motor 70 in the rear axle casing.

Figure 4:
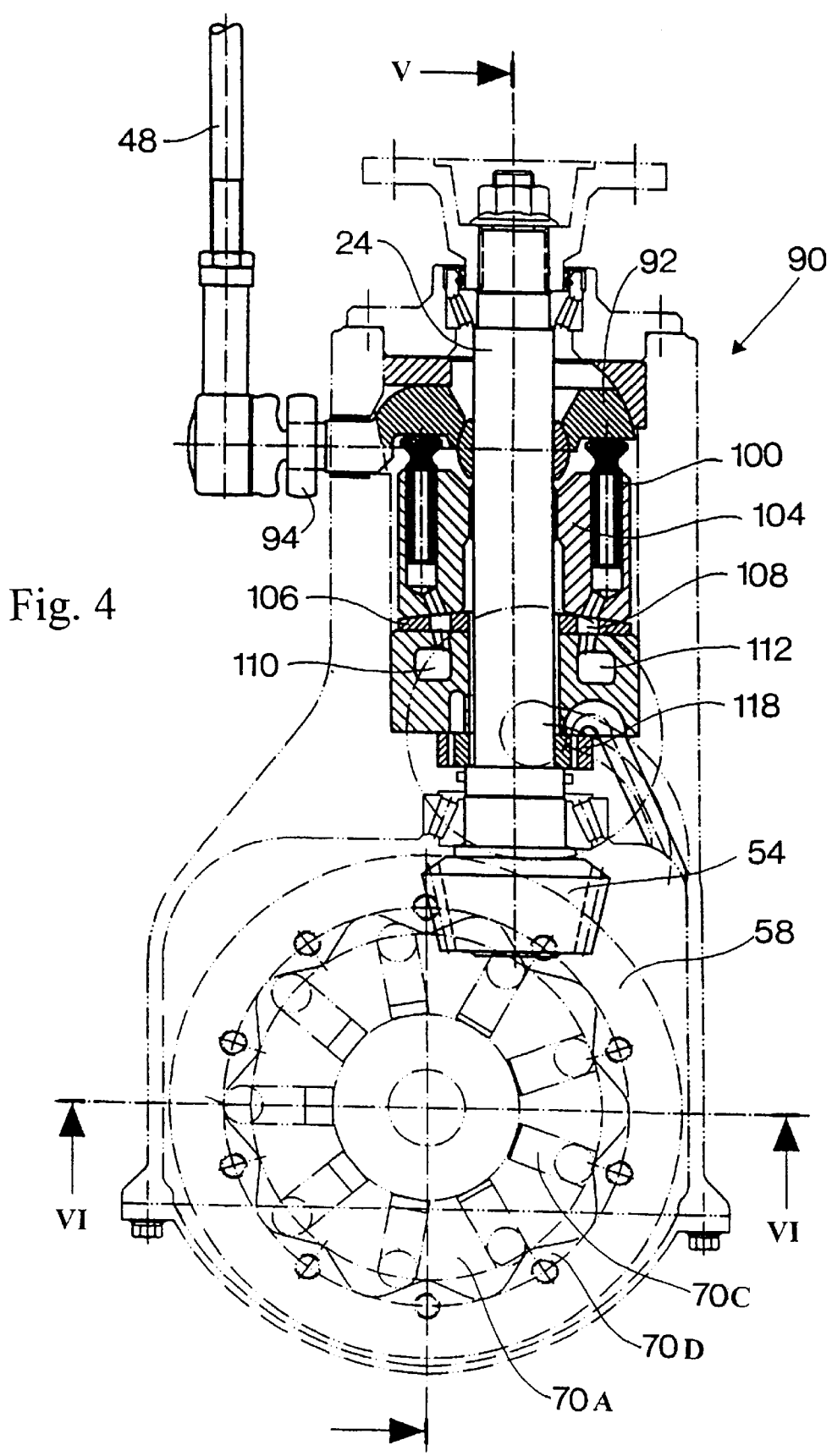
FIG. 4 shows a detailed view in cross-section of another embodiment of the device according to the invention.
Figure 5:
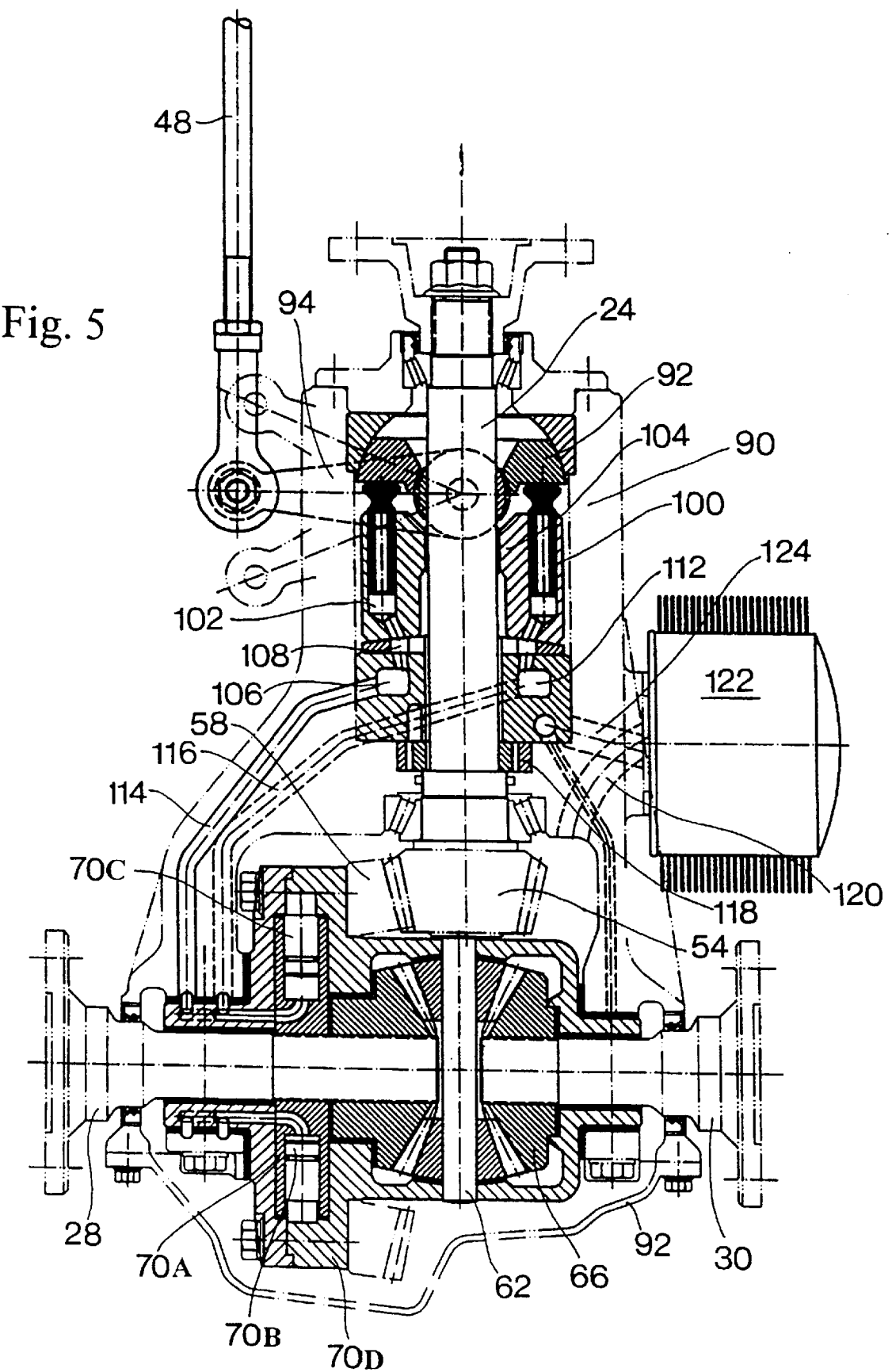
FIG. 5 shows a view cut away taken along the line V—V in FIG. 4.
Figure 6:
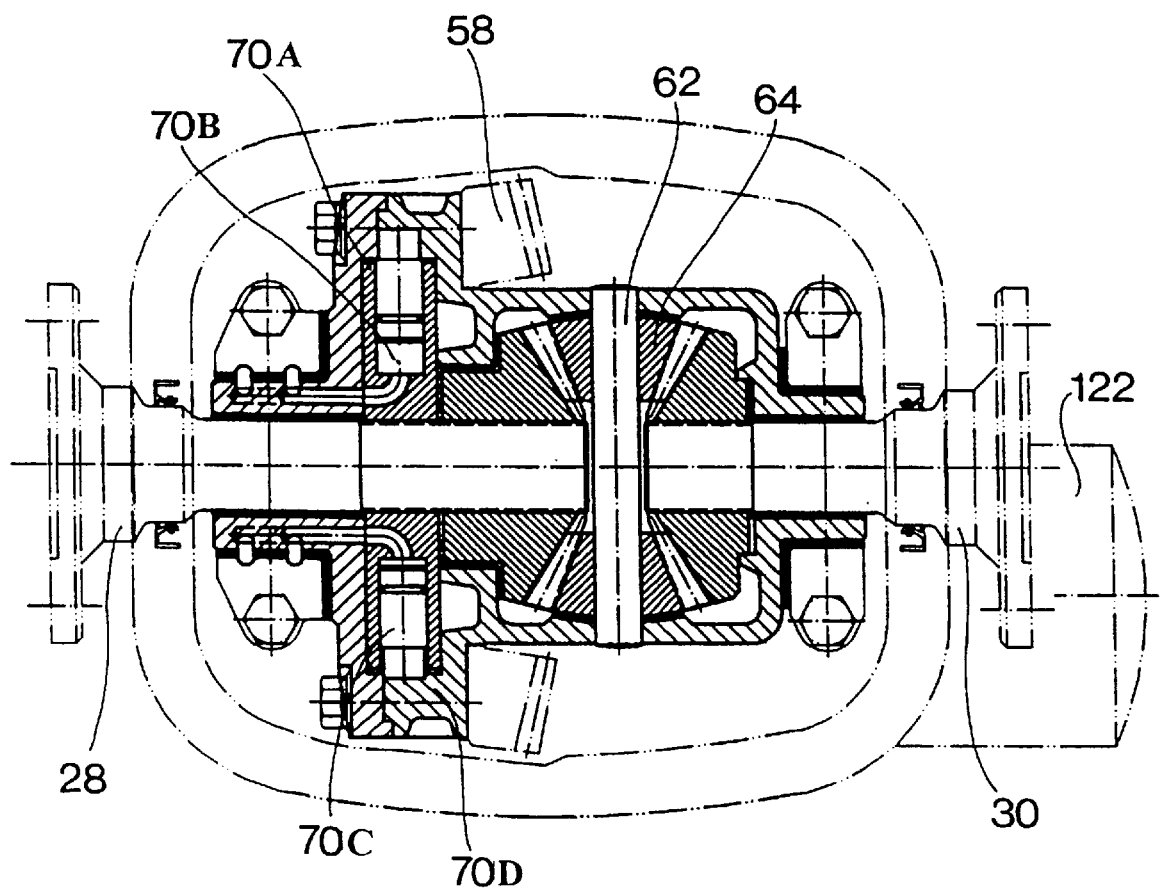
FIG. 6 shows a view cut away taken along line VI—VI in FIG. 4.

FIGS. 4–6 show a further variant of the device according to the invention. In this a hydraulic pump 90 is also arranged in the rear axle casing 52. The final drive with the hydraulic motor has the same design as described earlier, in which the same components have the same reference numbers, and will not be described in greater detail here. The hydraulic pump 90 is arranged around the cardan shaft 24 or a shaft connected to this, and comprises a cam disk 92. The inclination of the cam disk is regulated by a connecting rod 94 and an articulated rod connected to this which is attached in the manner described earlier to the vehicle's steering connecting rod. Pistons 100 are assigned slidably to the cam disk. The pistons 100 extend into cylinder bores 102 arranged in a pump casing 104, which pump casing is fixedly attached to the shaft 24. From the cylinder bores 102 a number of passages run via a control disk 106. The control disk 106 is disposed with passages 108 in a certain configuration to control the flow from the cylinders 102. The passages 106 in the control disk communicate with two chambers 110, 112 arranged in the end of the pump casing. From the respective chambers 110, 112 and the pistons in the rotor a conduit 114, 116 is arranged. Disposed in the end of the pump casing is a support pump 118. A feed conduit 120 is arranged from the bottom of the rear axle casing and an oil filter 122 fitted on the side of the rear axle casing. Disposed between the oil filter 122 and the support pump 118 is a supply conduit 124.

Operation of the hydraulic motor 90 with the directed flow from the pump takes place in the same manner as described above. In this case, the flow quantity and direction are controlled by turning the steering connecting rod 94, in which case the cam disk 92 will be tilted. The rotating pump casing 104 and pistons 100, which slide against the cam disk, will move in the cylinder bores 102. Tilting of the cam disk depending on the steering deflection means that the pump pistons supply a flow with a certain direction via one of the chambers 110, 112 and then via one of the lines 114, 116 to the cylinders in the rotor, the degree of tilting and the velocity of rotation of the pump casing determining the magnitude of the flow.

Figure 7:
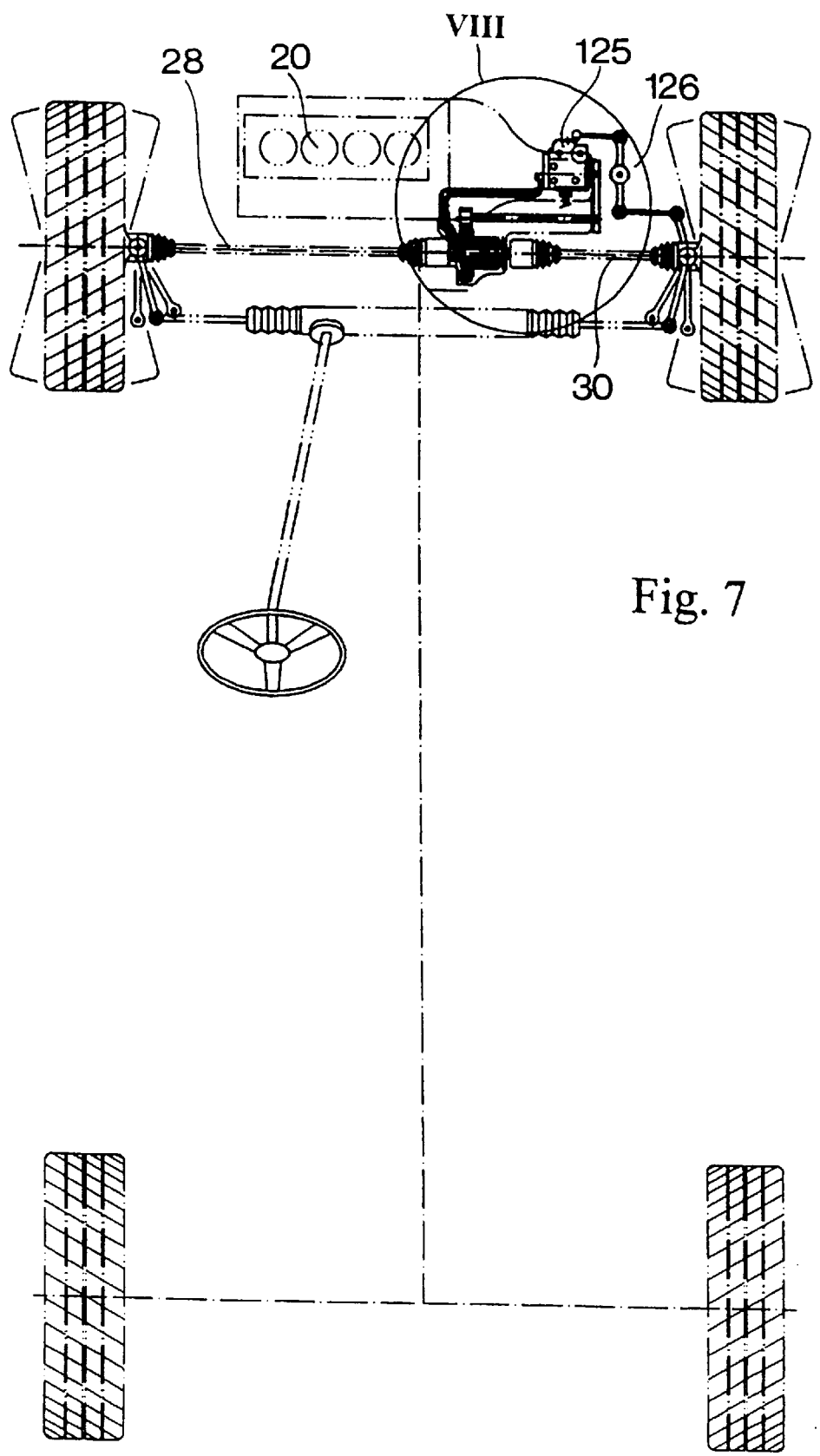
FIG. 7 shows a detailed view from above of another embodiment of the device according to the invention arranged in a front-wheel-driven car.
Figure 8:
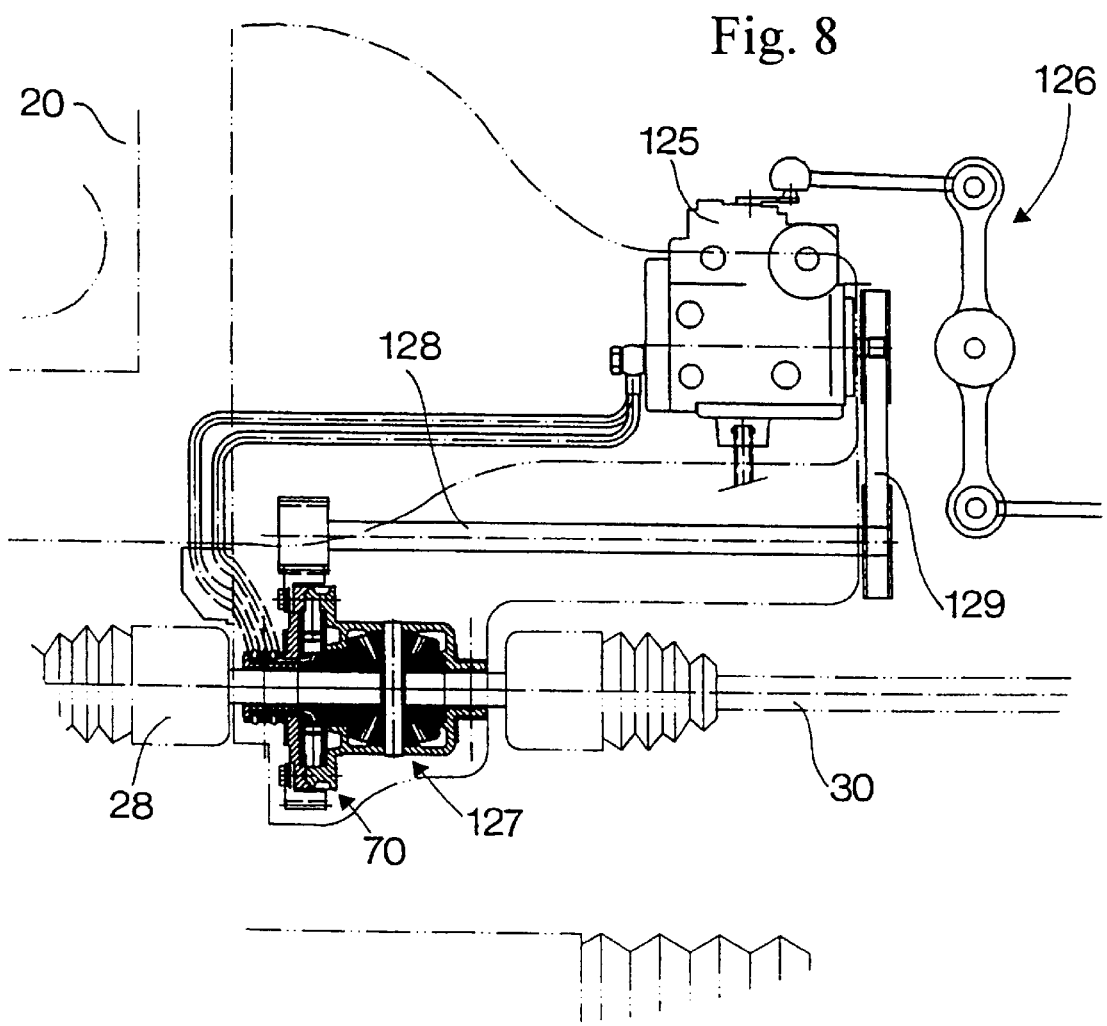
FIG. 8 shows a detailed view partly in cross-section of the area VIII in FIG. 7.

FIGS. 7–8 show another variant of the invention disposed in a front-wheel drive vehicle. Arranged close to the vehicle's engine 20 is a hydraulic pump 125 with variable displacement, and drivably connected to a shaft on the vehicle's gear box. An connecting arrangement 126 is disposed between the vehicle's steering system and the pump. A differential gear 127 of the conventional type and a hydraulic motor 70 of the type described previously are fitted between the vehicle's drive shafts 28, 30. Assigned to a driving shaft 128 arranged between the vehicle's gear box and differential gear is a belt transmission 129. The link between the driving shaft 128 and the hydraulic pump 125 ensures that its speed is proportional to the vehicle's propulsion velocity. The hydraulic pump and hydraulic motor function as described above.

Figure 9:
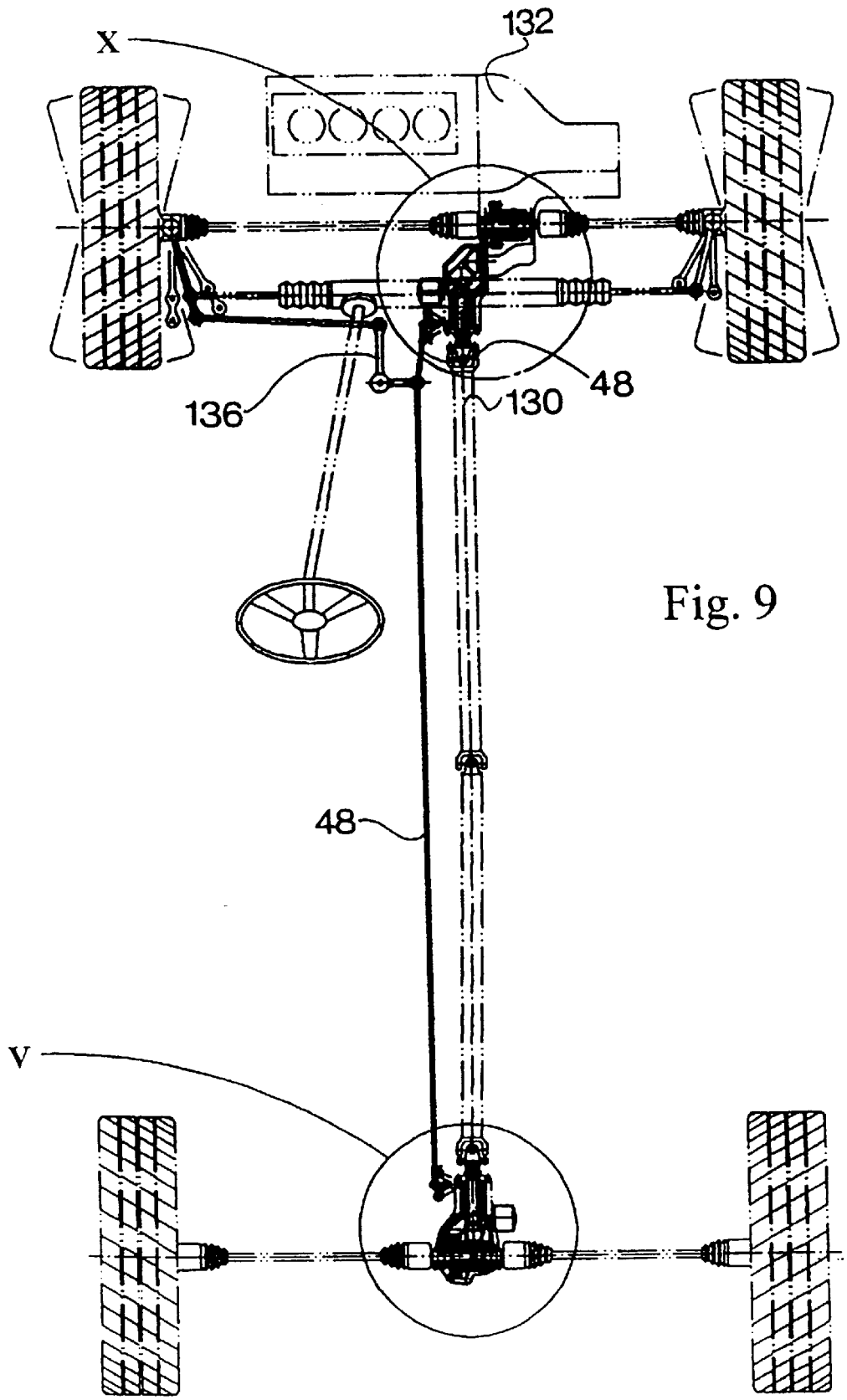
FIG. 9 shows a detailed view from above of a further embodiment of the device according to the invention arranged in a four-wheel-driven car.
Figure 10:
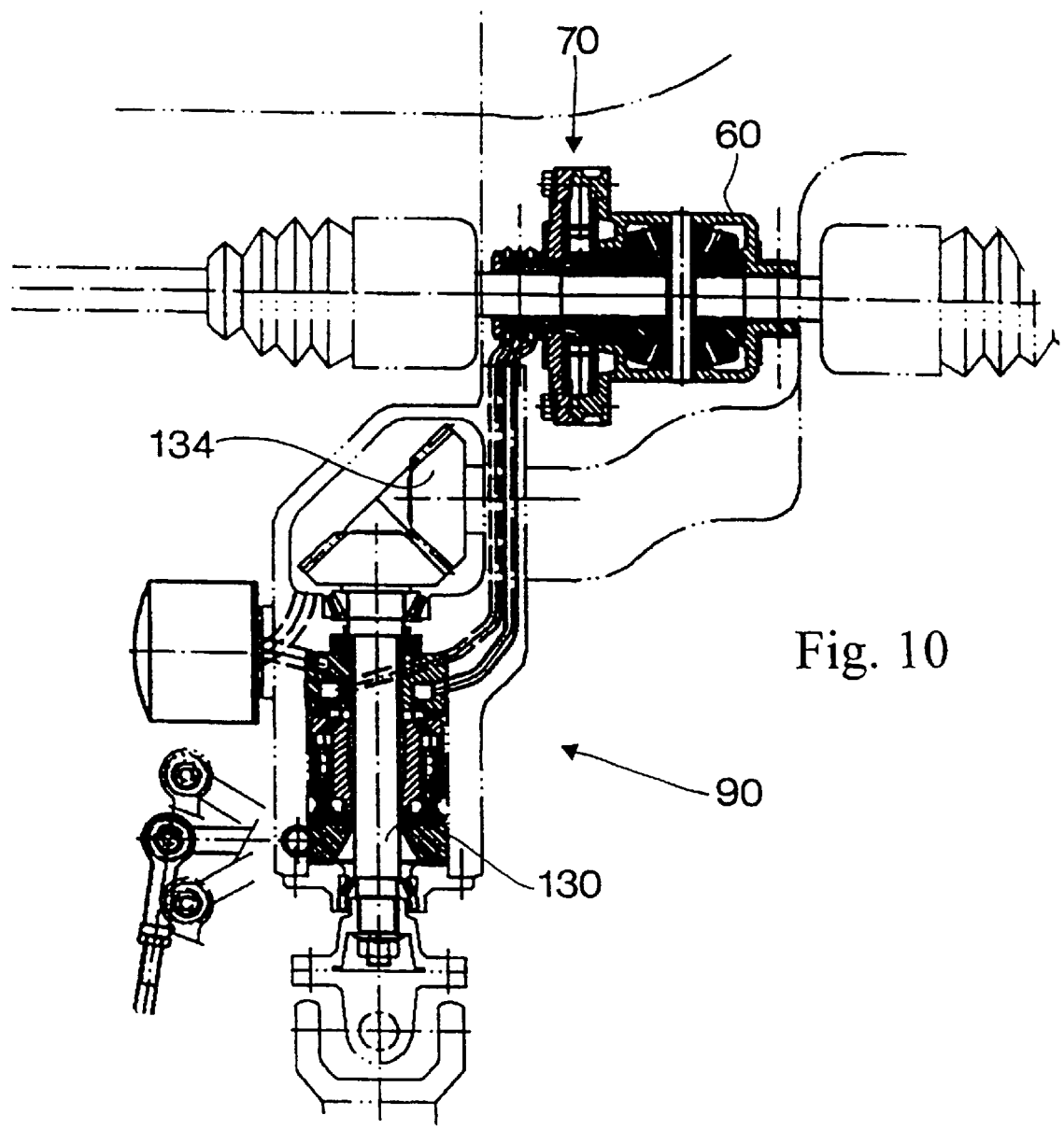
FIG. 10 shows a detailed view partly in cross-section of the area X in FIG. 9.

FIGS. 9–10 show a further variant of the invention disposed in a four-wheel-drive vehicle The device on the rear axle has the same design as described in connection with drawings 4–6 and will not be described in greater detail. In the case of the front axle, FIG. 9, the hydraulic Pump 90 is fitted on the output shaft 130 which connects the front and rear wheels. The output shaft 130 is drive n by the engine and g ear box 132 via an angular gear 134. Driving also takes place at the differential casing 60 which is arranged in the manner previously described with a differential gear and hydraulic motor 70. The connections for hydraulic oil are disposed between the hydraulic pump and hydraulic motor.

Figure 11:
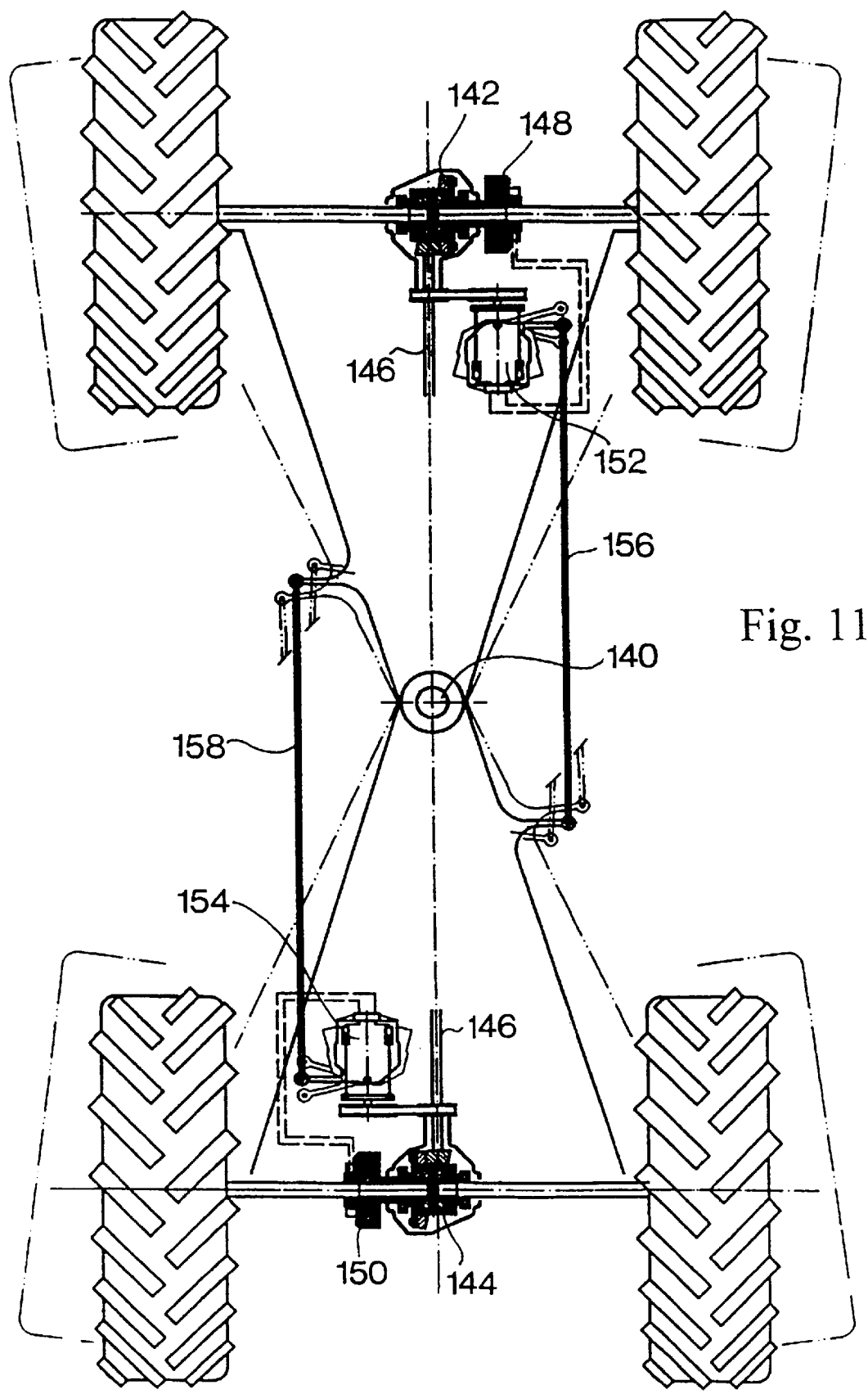
FIG. 11 shows a detailed view from above of the device arranged in a articulated frame steered contract vehicle.

The two hydraulic pumps are connected via connecting rod 48 to an angular rod 136 which is connected in turn to the vehicle's steering connecting rod. In this case, the respective pump will provide the respective hydraulic motor with a flow and a direction which corresponds to the steering deflection so that the front and rear drive shafts are driven with a rotational speed difference which matches the curve radii of the wheels, FIG. 11 shows the device in a articulated frame steered vehicle of the type of contract machines and the like, which are rotated around a central link 140 when they are to turn. These are four-wheel driven with a front and rear differential gear 142, 144 and primary shafts 146 from the engine. In this case, a hydraulic motor 148, 150 is arranged externally outside the respective differential gear. Each hydraulic motor is driven by a respective hydraulic pump 152, 154 in the manner described above. In this case, the hydraulic pumps are connected via connecting rods 156, 158 to the opposite side of the machine.

Figure 12:
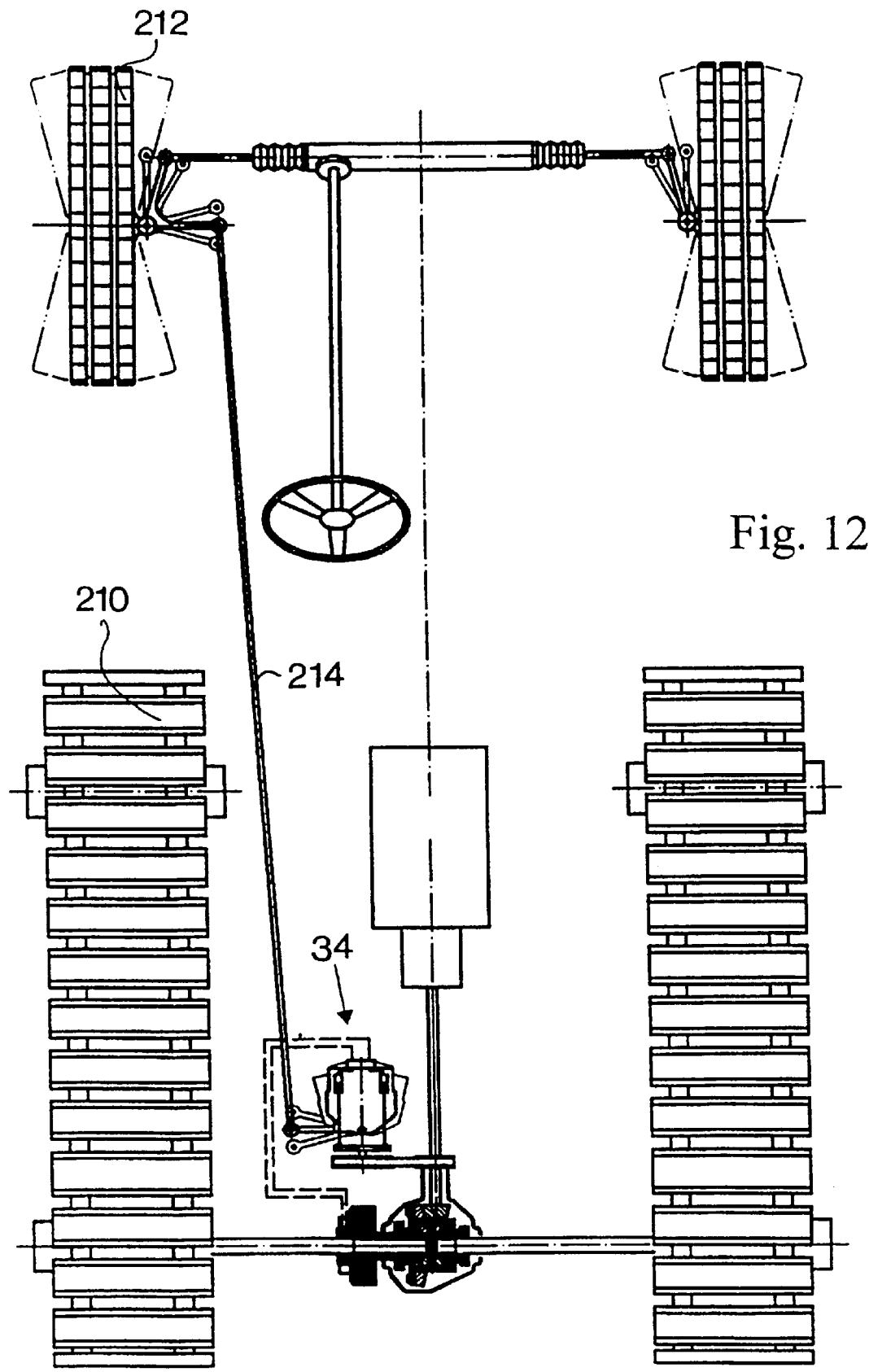
FIG. 12 shows a detailed view of the device arranged in a caterpillar-tracked vehicle with steering wheels.

FIG. 12 shows a further variant in which the device is used in a vehicle with a driving track 210 instead of wheels and steered by wheels 212. Here also the hydraulic pump 34 is controlled by the steering deflection via an articulated rod 214 so that one drive shaft rotates more quickly than the other in the manner described above.

It is to be understood that the invention is not restricted to the embodiments described above and shown in the drawings, but can be modified in the scope of the following patent claims.

What is claimed is:

1. A device for a differential gear for vehicles comprising a vehicle drive (32, 210) capable of driving the vehicle and a turnable wheel (18, 212) capable of changing a direction of the vehicle, which differential gear (26) comprises an input drive shaft (24, 128, 146), two output shafts (28, 30) connected to the vehicle drive (32, 210), at least one hydraulic pump (34, 90, 125, 152, 154) which is drivably connected to the vehicle drive which is disposed between an engine (20) of the vehicle and the two output shafts (28, 30) and capable of producing a hydraulic flow, and at least one hydraulic motor (70) communicating with the hydraulic pump and arranged to the differential gear (26), capable of achieving a difference in rotational speed between the output shafts, characterized by said turnable wheel (18, 212) connected to a device (48, 156, 158, 214) for transferring a steering deflection of the turnable wheel (32, 210) to a regulating mechanism (46, 94) of said pump and by a transmission (36, 129) which is connected to the vehicle drive at the output of or after a gear box (22, 132) to drive said pump (34, 90, 125, 152, 154) to obtain direct proportionality between the pump speed and a propulsion velocity of the vehicle, such that the output shafts (28, 30) are driven with a rotational speed difference which matches a curve radii of the turnable wheel (18, 212) and the propulsion velocity of the vehicle.

2. A device according to claim 1, characterized in that the hydraulic pump is of the displacement type and that the hydraulic motor is of the displacement type and arranged in a hydraulic transmission system, a certain gear ratio existing between the rotating shafts of the pump and the motor for certain values of the displacements.

3. A device according to claim 2, characterized in that said regulating mechanism is capable of varying the displacement of the pump.

4. A device according to claim 3, characterized in that said transmission (36, 129) of the pump comprises a flexible loop transmission.

5. A device according to claim 4, characterized in that the displacement of the hydraulic pump is varied gradually starting out from a steering direction of the turnable wheel (18, 212) so that synchronization of the speed difference of the output shafts with the steering deflection and velocity is obtained.

6. A device according to claim 3, characterized in that the flow from the hydraulic pump being substantially zero when the velocity of the vehicle is zero or the direction of steering of the wheel (18, 212) is straight forward, that the direction of an oil flow is controlled starting out from whether the steering direction of the turnable wheel (18, 212) deviates to left or right of a propulsion direction straight forward, that the displacement increases gradually the more the steering direction of the wheel (18, 212) deviates from a propulsion direction straight forward, and that the speed of the hydraulic pump and thereby the oil flow increases as the propulsion velocity increases.

7. A device according to claim. 1, characterized in that the hydraulic motor is enclosed in a final gear casing of the vehicle.

* * * * *